United States Patent
Dressel et al.

(10) Patent No.: US 12,394,923 B2
(45) Date of Patent: Aug. 19, 2025

(54) ELECTRICAL CONNECTION ASSEMBLY HAVING TWO WELDED CONDUCTORS AND A LAYER OF CYANOACRYLATE GLUE BETWEEN THE CONDUCTORS, AND METHOD FOR THIS

(71) Applicant: TE Connectivity Germany GmbH, Bensheim (DE)

(72) Inventors: Andre Martin Dressel, Lampertheim (DE); Florian Brabetz, Gernsheim (DE); Aniruddha Berikai Vasu, Darmstadt (DE); Jens Huber, Heppenheim (DE); Matthias Beck, Feuchtwangen (DE)

(73) Assignee: TE Connectivity Germany GmbH, Bensheim (DE)

( * ) Notice: Subject to any disclaimer, the term of this patent is extended or adjusted under 35 U.S.C. 154(b) by 784 days.

(21) Appl. No.: 16/747,215

(22) Filed: Jan. 20, 2020

(65) Prior Publication Data
US 2020/0235503 A1 Jul. 23, 2020

(30) Foreign Application Priority Data
Jan. 18, 2019 (DE) .................. 102019200659.0

(51) Int. Cl.
*H01R 12/59* (2011.01)
*H01B 13/00* (2006.01)
*H01M 50/528* (2021.01)
*H01R 43/02* (2006.01)

(52) U.S. Cl.
CPC ......... *H01R 12/59* (2013.01); *H01B 13/0036* (2013.01); *H01M 50/528* (2021.01); *H01R 43/0221* (2013.01); *H01M 2220/20* (2013.01)

(58) Field of Classification Search
CPC ... H01R 11/16; H01R 4/029; H01M 2220/20; H01M 50/571; Y02E 60/10
See application file for complete search history.

(56) References Cited

U.S. PATENT DOCUMENTS

| 3,519,977 | A  | * | 7/1970  | Swearingen ........... | H01R 13/53 |
|           |    |   |         |                        | 439/588 |
| 2007/0128920 | A1 |   | 6/2007  | Brown et al. | |
| 2009/0160321 | A1 |   | 6/2009  | Verjans | |
| 2009/0247375 | A1 | * | 10/2009 | Smith .................. | A63B 21/222 |
|           |    |   |         |                        | 482/110 |
| 2011/0073572 | A1 |   | 3/2011  | Wang | |
| 2013/0073235 | A1 | * | 3/2013  | Reyntens ............... | G16Z 99/00 |
|           |    |   |         |                        | 324/426 |

(Continued)

FOREIGN PATENT DOCUMENTS

| CN | 1797847 A | * | 7/2006 |
| CN | 103596372 | * | 2/2014 |
| DE | 3831394 A1 | | 3/1990 |

(Continued)

OTHER PUBLICATIONS

Translation of JP2003257513, dated Sep. 12, 2003, 17 pages.
European Search Report, dated Jun. 15, 2020, 8 pages.

*Primary Examiner* — Jean F Duverne
(74) *Attorney, Agent, or Firm* — Barley Snyder

(57) ABSTRACT

An electrical connection assembly includes a pair of conductors welded onto one another and a layer including a cyanoacrylate glue disposed in an area between the conductors.

10 Claims, 2 Drawing Sheets

(56) References Cited

U.S. PATENT DOCUMENTS

2014/0284099 A1  9/2014  Saito

FOREIGN PATENT DOCUMENTS

| DE | 10 2015 100935 A1 | | 7/2016 |
|---|---|---|---|
| DE | 112018003439 T5 | * | 4/2020 |
| EP | 2679328 A1 | | 1/2014 |
| EP | 3031564 A1 | | 6/2016 |
| JP | H0288684 A | * | 3/1990 |
| JP | H08510857 A | * | 11/1996 |
| JP | 2003257513 A | | 9/2003 |

* cited by examiner

ELECTRICAL CONNECTION ASSEMBLY HAVING TWO WELDED CONDUCTORS AND A LAYER OF CYANOACRYLATE GLUE BETWEEN THE CONDUCTORS, AND METHOD FOR THIS

CROSS-REFERENCE TO RELATED APPLICATION

This application claims the benefit of the filing date under 35 U.S.C. § 119(a)-(d) of German Patent Application No. 102019200659.0, filed on Jan. 18, 2019.

FIELD OF THE INVENTION

The present invention relates to an electrical connection assembly and, more particularly, to an electrical connection assembly having at least two conductors welded onto one another.

BACKGROUND

When welding ribbon cables to battery contacts in electric vehicles, it is important to protect the conductors which are welded onto one another against electrochemical corrosion. Moreover, it is advantageous if the welding point has relief from tension.

SUMMARY

An electrical connection assembly includes a pair of conductors welded onto one another and a layer including a cyanoacrylate glue disposed in an area between the conductors.

BRIEF DESCRIPTION OF THE DRAWINGS

The invention will now be described by way of example with reference to the accompanying Figures, of which.

DETAILED DESCRIPTION OF THE EMBODIMENT(S)

Figure 1:
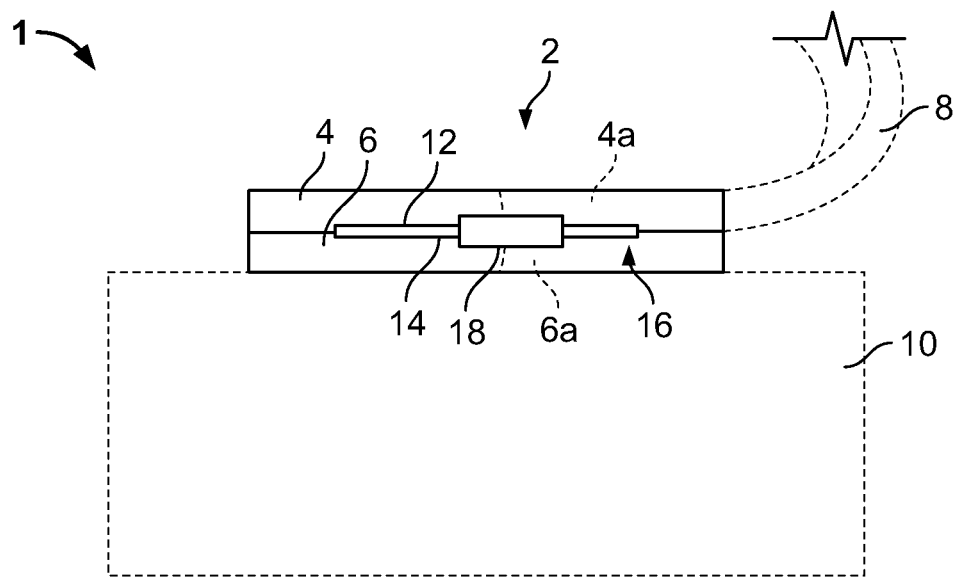
FIG. 1 is a schematic diagram of a portion of power electronics.

Exemplary embodiments of the present invention will be described hereinafter in detail with reference to the attached drawings. For the sake of simplicity, the same reference numbers are used in the drawings for elements which correspond to one another in terms of function and/or design. The combination of features depicted and described using the exemplary embodiments serves solely as an example and can be changed within the scope of the invention. For example, it is possible to omit a feature whose technical effect is of no importance in a particular application. Conversely, it is possible to add a feature which is not present in the depicted combination of features of the exemplary embodiment if the technical effect linked to this feature is required for a particular application.

A portion of a power electronics 1, shown in FIG. 1, has an electrical connection assembly 2. In an embodiment, the power electronics 1 are used in an electrically powered vehicle.

The electrical connection assembly 2, as shown in FIG. 1, has at least two conductors 4, 6 welded onto one another. In addition, the electrical connection assembly 2 may have further conductors 4a, 6a, which are merely indicated by dashed lines in FIG. 1. One of the conductors, in this case the conductor 4, may be part of a ribbon cable 8. The other conductor, in this case the conductor 6, may be connected to a battery 10.

At least one of the conductors 4, 6 may be made of an aluminum-containing material, in order to keep the electrical resistances low. At least one of the conductors 4, 6 may be produced from a sheet metal material and in particular may be configured in a disc or plate shape.

The two conductors 4, 6 lie on one another as planarly as possible. At least one layer 12 consisting of or containing a cyanoacrylate glue 14 is located between the conductors 4, 6, as shown in FIG. 1. The area 16 in which the cyanoacrylate glue 14 is located surrounds, at least partially, a welding point 18 at which the at least two conductors 4, 6 are materially connected to one another.

Figure 2:
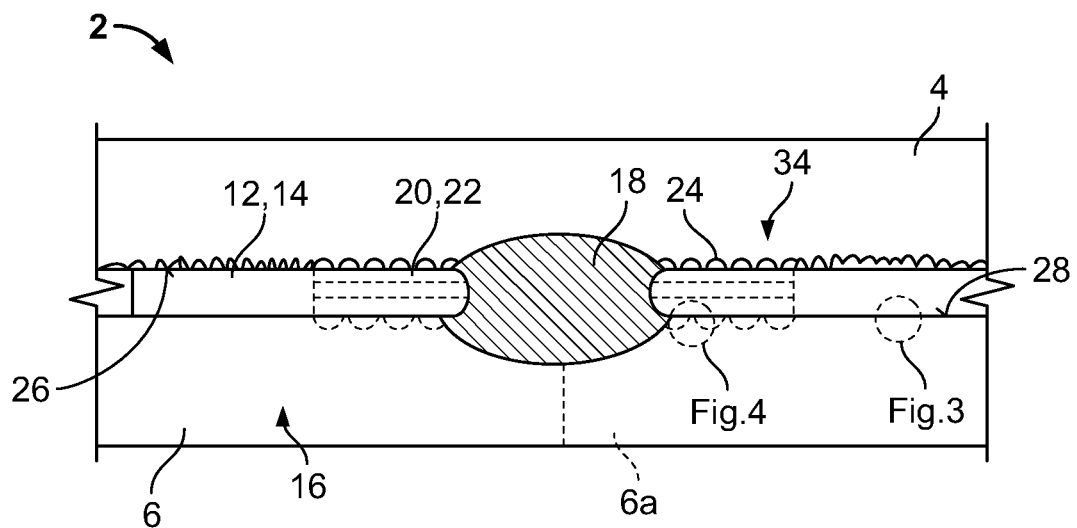
FIG. 2 is a schematic diagram of an electrical connection assembly of the power electronics.

As shown in FIG. 2, at least one layer 20 comprising a material 22 which impedes or prevents the hardening of the cyanoacrylate glue 14 may be present close to or adjacent to the welding point 18. The material 22 which impedes or prevents the hardening of the cyanoacrylate glue may be a moisture-absorbing material and/or an acidic substance, for example. A hydrophilic or hydrophobic layer can be manufactured by a Pyrosil method, for example. The inhibition of hardening can be performed, for example, by the use of an acid with a solvent, such as formic acid and acetone. In an embodiment, the welding point 18 can be at least partially, or completely, surrounded by the material 22.

The layer 20 consisting of or comprising the material 22 may be arranged between the layer 12 of the cyanoacrylate glue 14 and a conductor 4, 6 or between two opposing layers 12 of cyanoacrylate glue 14. A layer 20 of the material 22 which impedes or prevents the hardening of the cyanoacrylate glue 14 may be present on one of the conductors 4, 6 or on both opposing conductors 4, 6. The material 22 may be integrated into an electrical insulation of a conductor 4, 6, for example a ribbon cable, this material being released by the insulation upon welding. In an embodiment, a later hardening of the cyanoacrylate glue 14 can be achieved by exposing the cyanoacrylate glue 14 to an activator, for example an alkaline environment.

The layer 12 and/or the layer 20 was originally also present at least partially at the point at which the welding point 18 is located after the conductors 4, 6 are welded. The welding point 18 may have fully replaced the layer 20, meaning that no remnant of the layer 20 is present any longer. However, as shown in FIG. 2, there may still be remnants of the layer 20 between the conductors 4, 6 outside the welding point 18.

In an area 16 of the respective conductor 4, 6 which is coated with the cyanoacrylate glue 14, the surface 4 may be at least partially roughened, i.e. have a greater roughness R than the sections of the remaining, non-roughened surface. The roughening is indicated by reference number 24 in FIG. 2. The roughening may be performed by laser structuring, embossing, grinding, machining or sandblasting. As a result of the roughening 24, a predetermined surface roughness R is obtained which differs only slightly over a multiplicity of different conductors 4, 6.

The surface roughness R, in an embodiment, is measured in this case according to ISO 25178 and/or DIN 4760. The surface roughness R may be the mean roughness, the quadratic roughness, the averaged roughness depth or the maximum roughness depth in area 16 or a subarea thereof. The roughened area may have a greater surface roughness R than the non-roughened area which surrounds it at least partially. If the basic material of the conductor 4 or 6 already has a very great surface roughness R, the surface 4 may also be provided with a lower surface roughness R in area 16, by means of polishing or smoothing, for example. A polished or smoothed area is then accordingly present instead of the roughening 24.

In FIG. 2, only one surface 28 of the one conductor 4 has a roughening 24. Of course, it is also possible for the two opposing surfaces 26, 28 of the conductors 4, 6 to be roughened.

Figure 3:
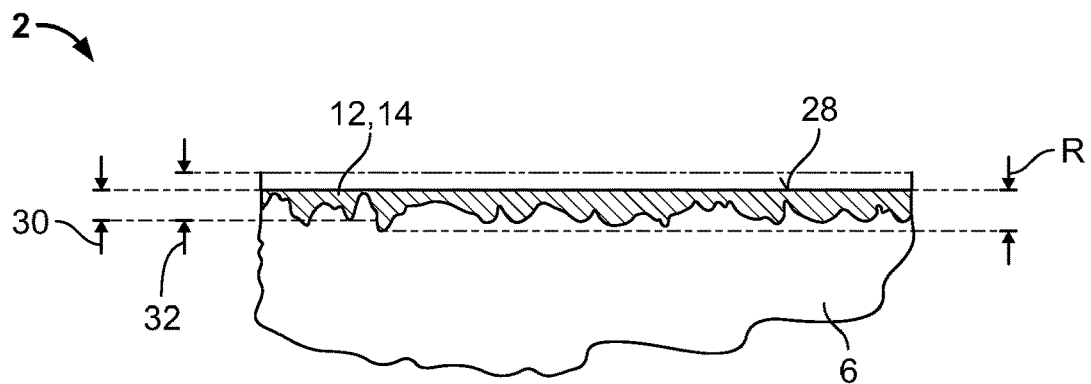
FIG. 3 is a schematic diagram of a detail of FIG. 2.

Only the conductor 6 is shown in FIG. 3 for the purposes of exemplification. The description, however, can similarly relate to the conductor 4. The surface 28 of the conductor 6 has a surface roughness R. The layer 12 of the cyanoacrylate glue 14, which has a layer thickness 30, is located on the surface 28. The layer thickness 30 corresponds to a maximum of double the surface roughness R and, in an embodiment, to at least one times the surface roughness R within a tolerance of ±30%.

The layer thickness 30, shown in FIG. 3, corresponds at least approximately just to the surface roughness R, meaning that it just about covers or just releases the tips of the surface roughness R. At the tips of the surface roughness R, the layer thickness 30 is therefore, in an embodiment, virtually zero. The layer 12 may also be applied without roughening 24, as shown in FIG. 2. However, due to a varying surface roughness R, the layer thickness 30 under some circumstances is subject to relatively large deviations and the characteristics of the connection assembly 2 are less reproducible.

Figure 4:
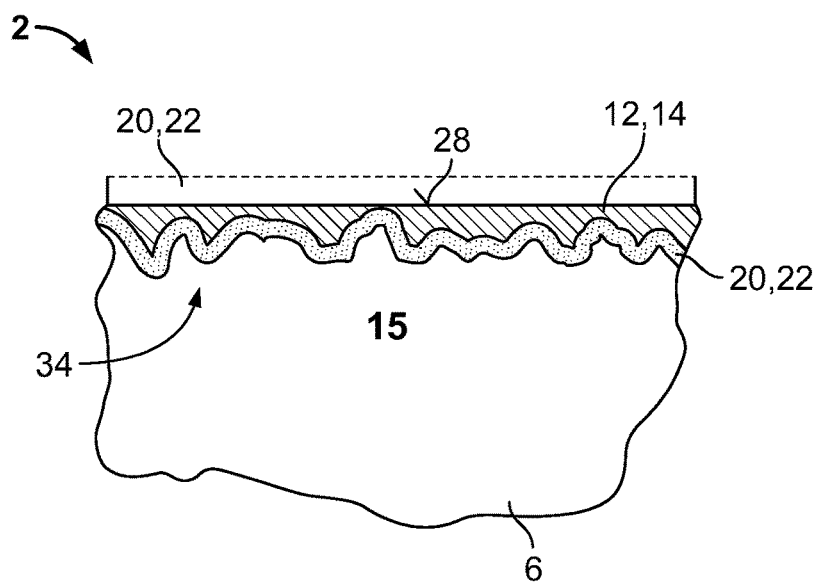
FIG. 4 is a schematic diagram of a detail of FIG. 2.

FIG. 4 shows a subsection 34, also shown in FIG. 2, in which the layer 20 of the material 22 which impedes or prevents the hardening of the cyanoacrylate glue 14 is located. In an embodiment, the subsection 34 is located completely within the area 16. The layer 20 consisting of or comprising the material 22 may be located directly on the conductor 6. However, as indicated by the dashed line, it may also be located on the layer 14 or on the conductor 4.

Figure 5:
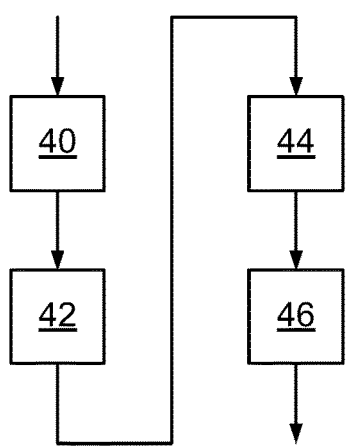
FIG. 5 is a flowchart of a method for manufacturing an electrical connection assembly.

In order to manufacture the electrical connection assembly 2 shown in FIGS. 1-4, the method steps shown in FIG. 5 are carried out.

In a first, optional method step 40, at least one of the conductors 4, 6 is roughened in order produce a predetermined surface roughness R.

In a step 42, at least one of the conductors 4, 6 is coated with cyanoacrylate glue 14. Here, the layer thickness 30, as described above, is a maximum of double the surface roughness R. If the conductor 4, 6 on which the cyanoacrylate glue 14 has been applied has been roughened previously, then the cyanoacrylate glue 14 is applied onto the roughened area.

A further optional step 44 of the method relates to the application of a layer 20 of the material 22 which impedes or prevents the hardening of the cyanoacrylate glue 14. The step 44 can be carried out before or after step 42. The material 22 which impedes or prevents the hardening of the cyanoacrylate glue 14 can be applied directly onto a conductor 4, 6 or onto the layer 12. In this case, the material 22 may be applied onto a conductor 4, 6 which is not coated with cyanoacrylate glue 14, as long as the layer 12 is located on the opposing conductor 4, 6. However, in this configuration, the two conductors 4, 6 should be brought together directly after the coating, in order to inhibit or impede the hardening of the cyanoacrylate glue 14 in the subsection 34.

In a step 46, the conductors 4, 6 are then welded onto one another at at least one welding point 18. The welding, in an embodiment, takes place by way of, in particular, ultrashort laser pulses. The welding point 18 is located in an area in which the layer 12 is located, i.e. in the area 16. In addition, the welding point 18 is located where the layer 20 is also located, i.e. in the subsection 34 of the area 16.

In the final manufactured electrical connection assembly 2, the conductors 4, 6 are electrically connected to one another by the welding point 18. The layer 12 of cyanoacrylate glue 14 represents an additional mechanically loadable connection which relieves the tension on the welding point 18. Due to the thin layer thickness 30, the glue may be applied prior to the welding 18. The layer 12, in an embodiment, hermetically encloses the welding point 18 and thus protects it from electrochemical corrosion. Outside the welding point 18, the two conductors 4, 6 can directly contact one another at tips of the surface roughness R, which further reduces the contact resistance between the conductors 4, 6.

What is claimed is:

1. An electrical connection assembly, comprising:
   a pair of conductors welded onto one another;
   a layer including a cyanoacrylate glue disposed in an area between the conductors, the conductors are welded onto one another at a welding point, a weld formed at the welding point is at least partially surrounded by the cyanoacrylate glue, the conductors have a pair of surfaces facing each other, at least one of the surfaces is at least partially roughened in the area, a thickness of the layer including the cyanoacrylate glue is a maximum of double a surface roughness of the at least one of the surfaces; and
   a material that impedes or prevents a hardening of the cyanoacrylate glue located at least in a subsection of the area.

2. The electrical connection assembly of claim 1, wherein the conductors are formed of a sheet metal material at least in the area.

3. The electrical connection assembly of claim 1, wherein at least one of the conductors is made of an aluminum-containing material.

4. The electrical connection assembly of claim 1, wherein the conductors directly contact one another outside the welding point.

5. The electrical connection assembly of claim 1, wherein one of the conductors is part of a ribbon cable.

6. A power electronics, comprising:
   a battery; and
   an electrical connection assembly including a pair of conductors welded onto one another and a layer including a cyanoacrylate glue disposed in an area between the conductors, the conductors are welded onto one another at a welding point, a weld formed at the welding point is at least partially surrounded by the cyanoacrylate glue, the conductors have a pair of surfaces facing each other, at least one of the surfaces is at least partially roughened in the area, a thickness of the layer including the cyanoacrylate glue is a maximum of double a surface roughness of the at least one of the surfaces, one of the conductors is connected to the battery.

7. A method for welding a pair of conductors, comprising:
coating an area of at least one of the conductors with a cyanoacrylate glue;
at least partially roughening the area prior to the coating, the conductors have a pair of surfaces facing each other, at least one of the surfaces is at least partially roughened in the area, a thickness of a layer including the cyanoacrylate glue is a maximum of double a surface roughness of the at least one of the surfaces;
applying a material that impedes or prevents a hardening of the cyanoacrylate glue onto at least a subsection of the area; and
welding the conductors onto one another with a plurality of laser pulses after the coating, the welding is conducted in the subsection of the area and a welding point produced by the welding is at least partially surrounded by the cyanoacrylate glue.

8. The method of claim 7, wherein the material is applied before or after the coating step.

9. The method of claim 8, wherein the welding step occurs after applying the material.

10. The method of claim 7, further comprising exposing the cyanoacrylate glue to an activator.

* * * * *